United States Patent [19]

Darling et al.

[11] Patent Number: 4,673,051
[45] Date of Patent: Jun. 16, 1987

[54] POWER STEERING GEAR WITH TWO-WAY CHECK VALVE

[75] Inventors: Richard S. Darling, Highland; Stanley R. Goodrich, Jr., Saginaw; Alan D. Holzhausen, Frankenmuth, all of Mich.

[73] Assignee: General Motors Corporation, Detroit, Mich.

[21] Appl. No.: 837,826

[22] Filed: Mar. 10, 1986

[51] Int. Cl.4 ............................................. B62D 5/08
[52] U.S. Cl. ..................................... 180/132; 91/447; 137/493.3; 137/493.9
[58] Field of Search ............................... 180/132, 148; 137/493.3, 493.6, 493.9; 91/446, 447

[56] References Cited

U.S. PATENT DOCUMENTS

| | | | |
|---|---|---|---|
| 1,885,121 | 11/1937 | Loweke | 137/493.6 |
| 2,226,022 | 12/1940 | Shutts | 137/493.9 |
| 2,349,416 | 5/1944 | Freeman | 137/493.4 X |
| 3,125,117 | 3/1964 | Borgard | 137/493.4 |
| 3,392,633 | 7/1968 | Kokaly | 137/493.6 X |
| 3,751,002 | 8/1973 | Folkerts et al. | 251/148 |
| 4,203,287 | 5/1980 | Bennett | 60/329 |
| 4,232,585 | 11/1980 | Shea et al. | 91/432 |

FOREIGN PATENT DOCUMENTS

| | | | |
|---|---|---|---|
| 590712 | 7/1947 | United Kingdom | 137/493.9 |
| 730918 | 6/1955 | United Kingdom | 137/493.6 |

Primary Examiner—John A. Pekar
Attorney, Agent, or Firm—Charles R. White

[57] ABSTRACT

This double acting check valve allows hydraulic power steering oil to flow from the power steering pump through the valve to the power steering gear in normal operation. During an impact load at the tire, the piston in the gear forces the oil from the gear to the check valve which controls or meters the oil flow and pressure so that the impact is not transmitted back to the steering wheel. In the event that the impact load is severe and pressures build up within the power steering gear, as a result, the blow off valve opens to allow such back flow to reduce or eliminate damage to the gear housing.

5 Claims, 7 Drawing Figures

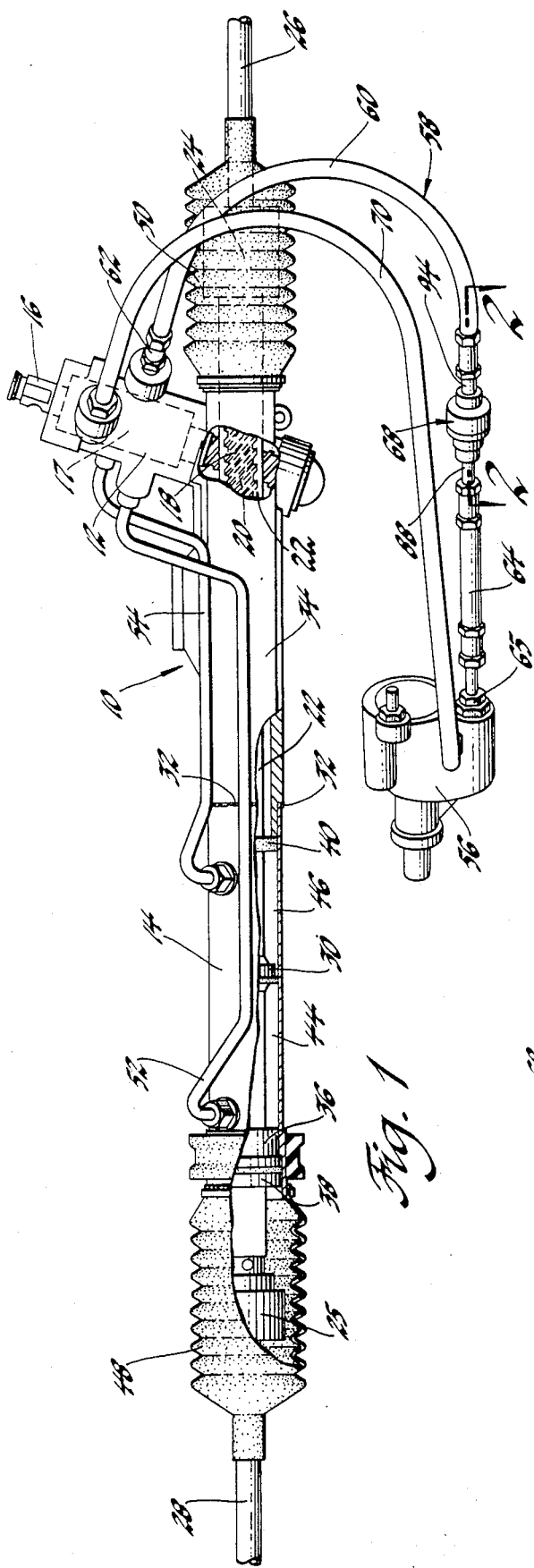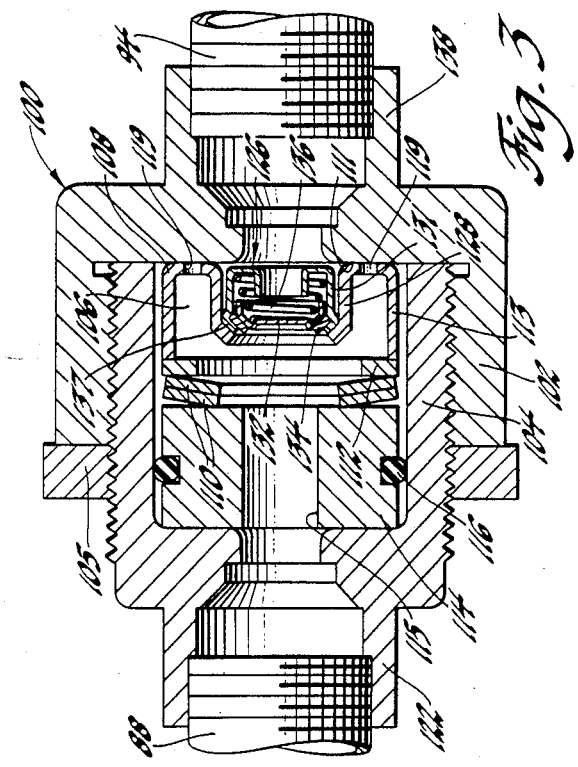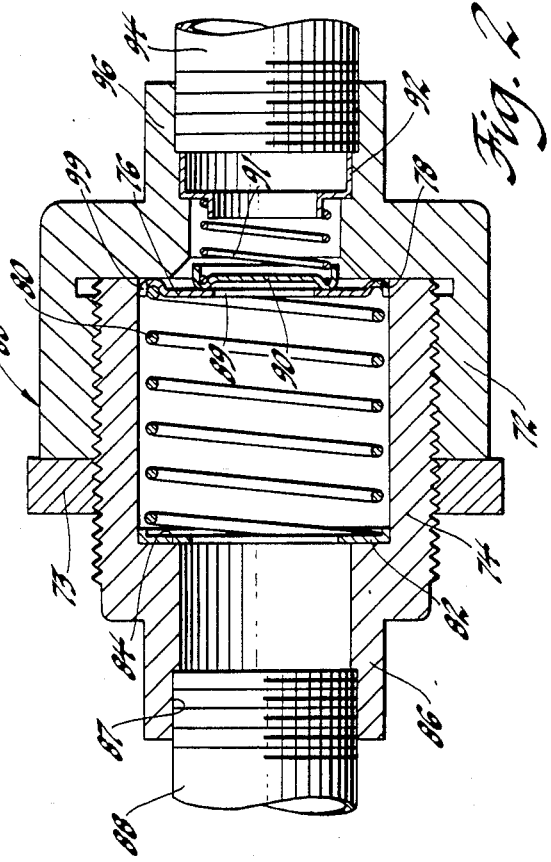

POWER STEERING GEAR WITH TWO-WAY CHECK VALVE

This invention relates to hydraulic power steering gears and more particularly to a new and improved two-way high pressure flow check valve to control the buildup of pressure in the gear to prevent damage thereto while limiting hand wheel motions through the gear from road wheel encounter with rough road irregularities.

Hydraulic power steering gears have been effectively employed in many vehicles and provided improved steering with long service life. To further improve service life, some specialized vehicles utilize check valves in the hydraulic lines leading from the power steering pump to the gear to control hand wheel kick back or oscillations induced into the steering system when the dirigible wheels encounter off road obstacles, very rough road, sudden breaking on chatter bumps, large pot holes and other unusual road irregularities. An illustrative steering gear of this type is disclosed in U.S. Pat. No. 4,232,585 to Shea et al assigned to the assignee of this invention. The present invention is of this general category but further advances the power steering art by providing improved control of high pressure oil in the gear for optimized protection of the power cylinder of the gear in addition to highly effective checking of rough road feedback to the steering wheel to prevent undesired wheel shaking and oscillations.

More particularly, this invention involves a power steering gear with a thin wall power cylinder or rack housing tube fitted on the thick wall shoulder of a main housing, usually cast from aluminum. The two-way check valve of this invention protects the power cylinder and particularly the joint interconnecting the cylinder to the thick wall main housing from high pressure in the cylinder tube which may otherwise produce forces to damage the tube or damage the joint to the housing to reduce service life. This invention normally prevents back flow induced from road surfaces and wheel kick from causes such as pot holes. The blow off feature of the valve of this invention can be readily calibrated for any suitable pressure for highly effective power steering gear protection.

More particularly, the function of this double acting check valve is to allow hydraulic power steering oil to readily flow from the power steering pump through the double-acting check valve to the power steering gear for power assist steering. During an impact load at the tire, the piston in the gear forces oil from the gear back to the check valve which controls or meters oil flow and pressure so that the impact is not transmitted back to the steering wheel. In the event that the impact is severely high, the double-acting check valve will open so that the flow is allowed to pass through the check valve to prevent damage to the power cylinder of the gear.

It is a feature, object and advantage of this invention to provide a new and improved two-way check valve to operate in conjunction with a power steering gear to provide new and improved two-way valving to eliminate or substantially reduce hand wheel vibrations induced by loads external of the vehicle and to prevent damage to the gear from the buildup of internal pressure from such loads.

Another feature, object and advantage of this invention is to provide a new and improved double-acting check valve which can be associated with the pressure port of a power steering gear and which normally prevents the reversal of fluid flow from the power gear back to the pump up to a predetermined pressure so that external loads on the power cylinder piston are not transmitted to the vehicle hand wheel and which opens after such predetermined pressure to reduce pressure in the power cylinder gear to inhibit damage thereto.

Another feature, object and advantage of this invention is to provide a hydraulic power steering gear for vehicles which provides new and improved two-way check valve that automatically blocks reversal of hydraulic fluid flow into the power steering pump so that hydraulic fluid within the gear inhibits feedback motion induced into the gear through the vehicle road wheels thereof but which opens after a predetermined high pressure is reached to protect the power steering gear from damage by the buildup of high pressures therein.

These and other features, objects and advantages of this invention will become more apparent from the following detailed description and drawing in which:

FIG. 1 is a side elevational view partly in section of a rack and pinion steering gear and an associated fluid pump with the double-acting flow control valve assembly of this invention operatively interposed between the pump and gear.

FIG. 2 is an enlarged cross-sectional view taken along lines 2—2 of FIG. 1 illustrating details of the double-acting flow control valve assembly of a preferred embodiment of this invention and showing the valve assembly in a flow check position.

FIG. 3 is an enlarged cross-sectional view similar to the FIG. 2 view illustrating another preferred embodiment of the invention.

Figure 4:
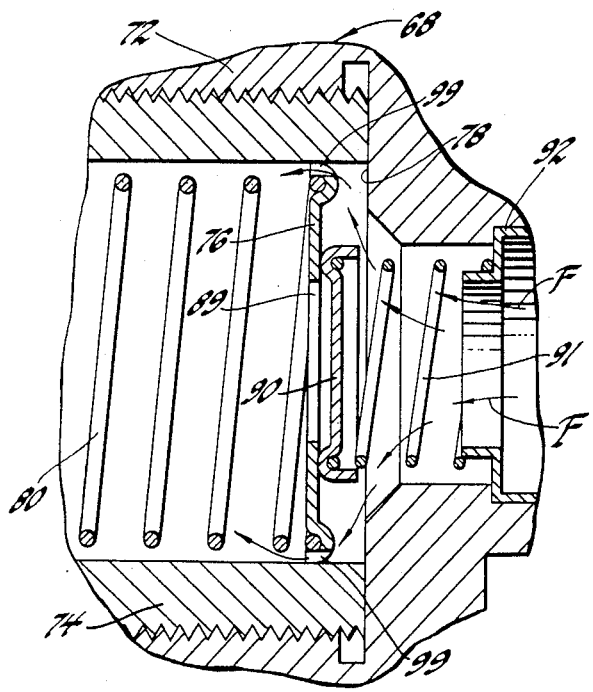
FIGS. 4 and 5 are cross-sectional views of the FIG. 2 embodiment respectively illustrating the double acting flow control valve of this invention in pressure relief and fluid feed operation.

Turning now in greater detail to the drawings, there is shown in FIG. 1 a rack and pinion power steering gear 10 having a thick wall cast aluminum main housing 12 and a thin wall power cylinder 14 fitted thereto. The gear 10 also has an elongated stub shaft 16 with an internal torsion bar, not shown, operatively mounted in the main housing 12. The stub shaft 16 and torsion bar are operatively connected to the valve body and spool of a rotary valve assembly 17 mounted in the main housing concentric with respect to the stub shaft for controlling the hydraulic operation of the steering gear as disclosed and explained in the U.S. Pat. No. 4,454,801 to Spann et al entitled "Power Steering Gear and Open Center Rotary Valve Therefor", issued June 19, 1984 and assigned to the assignee of this invention and hereby incorporated by reference.

As explained in detail in the above-referenced patent to Spann et al, the stub shaft and torsion bar form an assembly responsive to rotary input by the vehicle operator turning the steering wheel to turn the rotary valve for hydraulic power assist steering and to mechanically rotatably drive a pinion gear 18. The pinion gear meshes with the teeth 20 of an elongated cylindrical rack 22 that extends laterally through the main housing so that rotary movement of the pinion initiated by the operator manually inputs the rotary stub shaft to produce lateral linear movement of the rack to steer the front wheels of the vehicle. These wheels, not shown, are operatively connected to ball joints 24, 25 by associated tie rods 26, 28. The rack and pinion steering gear has hydraulic power assist with improved steering by optimized control of mechanical feedback to the steering wheel through the rack and pinion from rough and bumpy roads or from sudden breaking over chatter bumps and with optimized protection of the rack and pinion gear from buildup of internal fluid pressures therein.

To this end, a piston 30 fixed at an intermediate position on the rack 22 is mounted for sliding movement in the elongated thin wall power cylinder 14. The inboard end of the power cylinder is press-fitted and subsequently brazed at 32 or secured by threaded fasteners to a cylindrical shoulder portion of a laterally projecting extension 34 of the main housing. The power cylinder 14 and extension 34 may also be secured in axial alignment by threaded fasteners, not shown.

The rack 22 slidably projects through an interior bulkhead 36 seated within power cylinder 14 adjacent to the outer end thereof. The end of the power cylinder is closed by an outer bulkhead and seal 38 which also slidably receives the rack. An inner seal assembly 40 is fitted in power cylinder 14 adjacent to the end of housing extension 34 to hydraulically seal the inboard end of the power cylinder 14. With the inboard and outboard ends of the power cylinder sealed, fluid pressure chambers 44 and 46 are established on opposite sides of the piston 30. It will be appreciated that the teeth of the rack do not extend to the seal assembly under any condition of operation so that the sealing surfaces of the seal engages only the smooth cylindrical surfaces of the rack. Conventional resilient boots 48, 50 of suitable elastomer are employed to provide protective covers for the end of rack 22 and ball joints 24, 25.

Lines 52 and 54 are hydraulic lines operatively interconnecting the pressure chambers 44 and 46 to the rotary valve so that the hydraulic pressure differential across the piston as selected by the operator rotation of the valve can produce the desired power assist rack movement for steering purposes.

Hydraulic pressure for such power assist steering is supplied from engine driven hydraulic pump 56 through a pressure line assembly 58. This assembly includes a pressure line 60 connected by a fitting 62 to the main housing 12, a pressure line 64 connected by a fitting 65 to the pump 56 and double-acting check valve 68 which forms the part of this invention which operatively interconnects the pressure line 60 and 64. A return line 70 extends from operative connection with a main housing back to a reservoir chamber in the pump 56.

While the pressure line assembly 58 incorporates the double-acting check valve assembly 68 of this invention, it will be appreciated that the check valve assembly 68 could be readily installed on the main housing 12 if desired for compactness and to reduce the number of fittings.

In any event, the double-acting check valve 68 has a two-part housing assembly with an outer cylindrical housing 72 internally threaded to threadedly receive the externally threaded inner housing 74 and form a flow chamber to accommodate the operative components of the two-way check valve of this invention. Lock nut 73 threaded on the inner housing locks the two housings in the FIG. 2 position. More particularly, the double-acting check valve 68 includes a large diameter, washer-like blow off valve element 76. This valve element is biased to a closed and fluid sealing position against a valve seat 78 formed by the inner vertical wall of the outer housing by a helical spring 80. The base coil of this spring is grounded on a washer-like spring seat 82 that fits on a vertical wall 84 formed around a reduced diameter neck 86 of the inner housing 74. This neck has an axial flow passage therethrough and is internally threaded at 87 to threadedly receive the externally threaded end 88 of the pressure hose coupling.

The blow off valve element 76 has a central flow opening 89 therethrough which is controlled by a disk-like check valve element 90 which sealingly seats against the gear side of the blow off valve element 76 to block flow opening 89. The check valve element 90 is biased into sealing engagement against the blow off valve element 76 by a light helical spring 91. This spring is seated on the reduced diameter neck portion of a cylindrical spring seat 92 supported on the shouldered end of a pressure line fitting 94 threaded into the neck 96.

In operation, assuming that the road wheels have encountered a rough road surface sufficient to cause significant mechanical feedback to the rack, piston movement is checked as it attempts to force oil into the pressure line 60. However, check valve element 90 is in the closed or seated position of FIG. 2. Since movement of the piston is hydraulically checked by the incompressibility of the hydraulic fluid, roadway irregularities are inhibited from feedback movements of the rack and pinion and steering wheel kick back or oscillation is effectively reduced or eliminated.

In the event that the hydraulic loads on the piston and the power cylinder increase to a point at which the power cylinder could be damaged, the pressure on the check valve 90 and the associated blow off valve element 76 is so great that the force moves the valve elements to the reverse flow position of FIG. 4. In this position, the valve elements allow a back flow around the check valve and through the peripheral passages 99 in the blow off valve back to the pump as shown by the back flow arrows F. With this back flow, cylinder pressure is relieved and there is no pressure induced bulging of the power cylinder or breakage of the power cylinder at its connections to the main housing.

Figure 5:
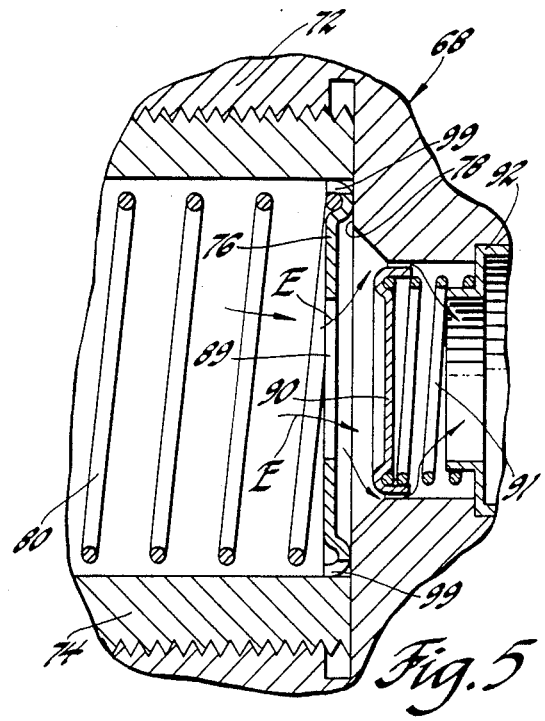

FIG. 5 illustrates by flow arrows E, the check valve element 90 displaced from sealing engagement with respect to the seated blow off valve element and against the action of spring 91. This is the normal power assist operation with pressure fluid being supplied by the pump through the power steering gear valving to the right or left turn pressure chambers as selected by the rotary input to the stub shaft from the vehicle operator.

FIG. 3 illustrates another preferred embodiment of the double-acting check valve of this invention and is identified by the reference numeral 100. As in the embodiment of FIG. 2, this embodiment has an outer housing 102 internally threaded to receive the externally threaded cylindrical inner housing 104 held in position by lock nut 105. These housings form a chamber 106 through which fluid flow is controlled by the valve elements comparable to those of FIG. 2. More particularly, there is a large diameter blow off valve element 108 in the general shape of a bisected torus which is normally spring-biased into sealing engagement by two conical disk springs 110 nested on one another which have peripheral outer contact with a washer 112, disposed between the projecting cylindrical wall 113 of the blow off valve element 108, and a large diameter spacer 114 having an inner bore 115 therethrough. The projecting cone of the first of the disk springs contacts the gear side face of the spacer 114 so that the blow off valve element 108 is biased into sealing engagement with the valve seat formed by the inner face 111 of the outer housing. In this valve seated condition, there is no fluid flow through the axial openings 119 in the contact face of this valve element. An O-ring seal 116 in the spacer 114 prevents the flow of oil around the outer periphery thereof. The inner housing 104 has an internally threaded neck 122 to threadedly receive the externally threaded end of fitting 88.

Figure 6:
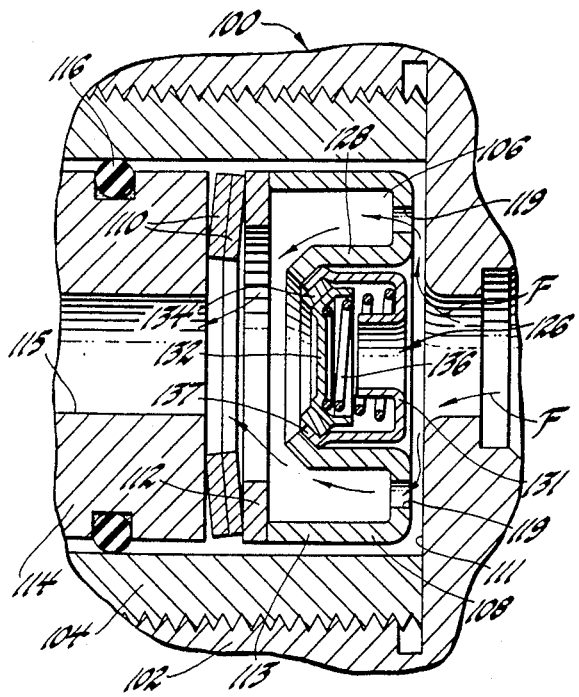
FIGS. 6 and 7 are cross-sectional views of the FIG. 3 embodiment respectively illustrating the double acting control valve in pressure relief and fluid feed operation.
Figure 7:
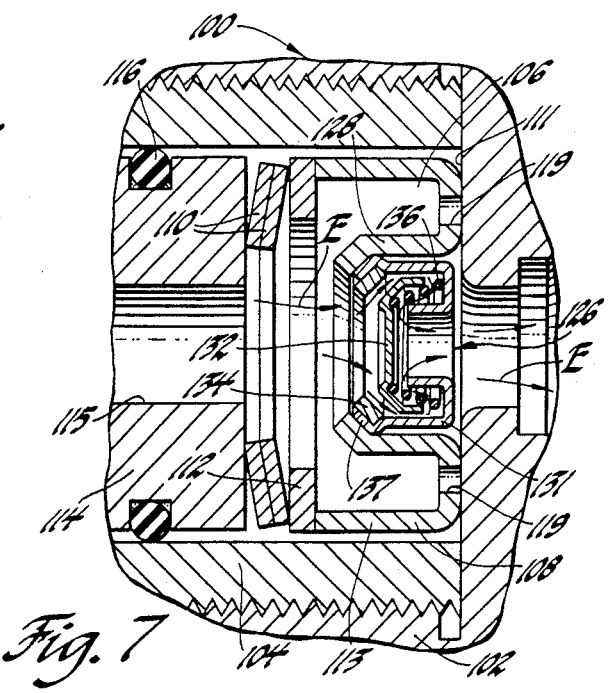

In addition to the blow off valve, the double-acting check valve assembly 100 has a check valve capsule 126 which is seated in the projecting cylindrical internal neck 128 of the blow off valve element 108. As shown in FIG. 3, the check valve has a thin-wall, main body 131 which is shaped somewhat like the blow off valve element 108. The check valve capsule also has a cap-like inner valve element 132 biased against a conical washer-like valve seat 134 by the spring 136 to block back flow of pressure fluid when chatter bumps or other road roughness is encountered by the road wheels of the vehicle. Valve seat 134 is trapped by bending the annular end of the cylindrical wall of the outer body of the check valve unit inwardly at 137 as shown in FIGS. 3, 6 and 7 and is bonded or otherwise secured thereto. The extending neck portion 138 of the outer housing is internally threaded to receive the external threads of the pressure line fitting 94 which is similar to that of the FIG. 2 embodiment.

In this preferred embodiment, oil enters the check valve from the power steering pump in the feed direction and flows through the valve passing through spacers, the disk spring, the washer and the check valve. Extremely small impacts from the road to the tie rods into the gear resulting in the rack piston trying to force oil back through the check valve toward the pump. However, the seat seats the check valve preventing any oil from passing through the check valve and this prevents undesired rotary motion of the vehicle steering wheel as previously indicated in connection with the FIG. 3 embodiment. Large impacts from the road though the rods into the gear result in the rack piston trying to force oil back through the check valve in the direction toward the pump. Now, however, the force is so great that the blow off or secondary check valve operates. The seat which contains the check valve unseats from the body as shown in FIG. 6 to allow oil to flow through the holes 119 in the check valve and through the centers of the washer, the disk spring and the spacer and back through the pump as shown by flow arrows F. Although the hydraulic pressure during these large impacts may be high, the flow is small and the duration in time is instantaneous. Therefore, the disk spring is compressed allowing the seat to open and meter oil flow and pressure back to the power steering pump. This reduces to an acceptable level or eliminates any feedback to the steering which the driver may feel.

FIG. 7 shows the double-acting check valve 100 in normal pressure feed operation to the gear for power assist operation. In this condition, the rotary valve has been turned for powered left or right hand turns by the vehicle operator and pressure fluid supplied by the pump 56 displaces valve element 132 from its seat so pressure fluid flows through the capsule as shown by the flow arrows F through the valving to a selected chamber on one side of piston 30 while the chamber on the other side of the piston is open to return line 70.

While a preferred embodiment of this invention has been shown and described to illustrate the invention, other embodiments will become apparent to those skilled in the art. Accordingly, the scope of this invention is set forth in the following claims.

The embodiments of the invention in which an exclusive property or privilege is claimed are defined as follows:

1. A hydraulic power assist steering system for a vehicle comprising a power steering gear having a housing with a piston therein separating said housing into separate fluid pressure chambers and movable in response to a pressure differential applied across said piston for the hydraulic power assist steering of said vehicle, a rotary valve assembly associated with said steering gear for directing an exhaust pressure fluid to and from said chambers, input shaft means for actuating said rotary valve assembly, hydraulic pump means for supplying pressure fluid to said rotary valve assembly, and double acting valve means operatively disposed between said hydraulic pump means and said rotary valve assembly, said double-acting valve means including a first valve element movable between an opened position in which pressure fluid is supplied from said pump means through said valve means to one of said chambers and a closed position in which pressure fluid is blocked from back flow from at least one of said chambers back to said pump means to inhibit movement of said piston and thereby movement of said shaft means and blow off valve means associated with said first valve element and operable therewith in response to the exertion of the force of a predetermined pressure extending a predetermined force on said first valve element and said blow off valve means to allow pressure fluid to back flow from at least one of said chambers to said pump to reduce pressure buildup in said housing and thereby preventing pressure damage thereto.

2. A power steering gear comprising a main housing and a power cylinder connected thereto, a piston mounted for sliding movement in said cylinder and cooperating therewith to form a pair of contractible and expandable fluid chambers, output means operatively connected to said piston and extending from said gear, a source of fluid pressure, a pressure port and an exhaust port in said housing, first fluid passage means connecting said source to said pressure port, second fluid passage means connecting said exhaust port to said source for the return of fluid thereto, manual input means extending into said main housing, a two-way check valve assembly operatively operable to allow the flow of pressure fluid from said source to said pressure port, said two-way check valve having a housing and a fluid flow passage therethrough, first and second valve elements in said valve housing, a valve seat in said valve housing for said first valve elements, first spring means in said valve housing for biasing said first valve element into engagement with said valve seat, a flow passage through said first valve element, a second valve element for opening and closing said flow passage in said first valve element, and second spring means for biasing said first valve element onto said valve seat to close said passage to thereby block the back flow pressure fluid from said power steering gear thereby stabilizing the movement of said piston from excitement by said output means, said first valve element being movable from said valve seat when said back flow pressure exceeds a predetermined pressure to allow limited flow to said source through said first fluid passage means.

3. A hydraulic power steering gear comprising an elongated cylindrical housing, a piston mounted for sliding movement in said housing and cooperating therewith to form a pair of expansible and contractible fluid chambers, output means operatively connected to said piston and extending through said chambers for operative connection to the dirigible wheels of a vehicle, a source of fluid pressure, a pressure port and an exhaust port, fluid passage means connecting said source to said pressure port, second fluid passage means connecting said exhaust port to said source, manual input means extending into said gear to be manually turned by a vehicle operator, said gear having valve means connected to said input means for controlling flow between said chambers and said pressure port and said exhaust port, a two-way check valve operatively associated with said pressure port, said two-way check valve comprising a valve housing having a fluid flow passage therethrough, first and second valve elements, a valve seat in said housing for a first of said valve elements, first spring means in said housing for biasing said first valve element into engagement with said seat, a flow passage in said first valve element, a second valve element for opening and closing said flow passage said first valve element, and second spring means for biasing said first valve seat onto said first valve element to close said passage therethrough to block the back flow of pressure fluid from said housing thereby stabilizing the movement of said piston from mechanical input by said output means and thereby resultant movement of said manual input means, said first valve element being moved from said valve seat when said back pressure exceeds a predetermined pressure to allow limited flow to said source through said check valve.

4. A double acting check valve assembly for a hydraulically actuated power steering gear comprising a valve housing operatively connecting a source of fluid pressure to said power steering gear and having a blow off valve element, a seat or said valve element, a spring having a first rate for biasing said valve element in sealing engagement with said seat, a check valve in said assembly biased by a spring against said blow off valve element and against the action of said first spring to prevent the back flow of fluid through said check valve thereby reducing vibratory excitations of said power steering gear, said blow off valve and said check valve being movable as a unit from said seat in response to the buildup of a predetermined pressure in said power steering gear to relieve the pressure therein, and said check valve being displaced by normal input from a source to allow pressure fluid to flow through said double acting check valve assembly to said power steering gear for power assist operation thereof.

5. The double-acting check valve of claim 4 wherein said check valve is a capsule having an outer cylindrical shell in which said check valve element is entrapped and spring means within said housing for biasing said check valve element against a valve seat within said housing.

* * * * *